US012413016B2

(12) United States Patent
Shimizu

(10) Patent No.: US 12,413,016 B2
(45) Date of Patent: Sep. 9, 2025

(54) CONNECTOR AND CONNECTOR DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Toru Shimizu, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 306 days.

(21) Appl. No.: 18/033,691

(22) PCT Filed: Nov. 11, 2021

(86) PCT No.: PCT/JP2021/041509
§ 371 (c)(1),
(2) Date: Apr. 25, 2023

(87) PCT Pub. No.: WO2022/102698
PCT Pub. Date: May 19, 2022

(65) Prior Publication Data
US 2023/0402770 A1    Dec. 14, 2023

(30) Foreign Application Priority Data

Nov. 12, 2020 (JP) .................................. 2020-188801
Aug. 25, 2021 (JP) .................................. 2021-137461

(51) Int. Cl.
*H01R 13/631* (2006.01)

(52) U.S. Cl.
CPC ..... *H01R 13/6315* (2013.01); *H01R 2201/26* (2013.01)

(58) Field of Classification Search
None
See application file for complete search history.

(56) References Cited

U.S. PATENT DOCUMENTS

2012/0015546 A1    1/2012    Yamaguchi et al.
2013/0196558 A1    8/2013    Adachi et al.
(Continued)

FOREIGN PATENT DOCUMENTS

JP    H11-149953 A    6/1999
JP    2000-150071 A    5/2000
(Continued)

OTHER PUBLICATIONS

International Search Report issued on Dec. 14, 2021 for WO 2022/102698 A1 (6 pages).

*Primary Examiner* — Ross N Gushi
(74) *Attorney, Agent, or Firm* — Venjuris, P.C.

(57) ABSTRACT

A first connector according to one aspect of the present disclosure capable of electrically connecting a first connection terminal of a first in-vehicle device and a second electrical contact portion of a second in-vehicle device is provided with a first terminal fitting and a first connector housing for accommodating the first terminal fitting. The first terminal fitting includes a first device-side connecting portion connectable to the first connection terminal and a first electrical contact portion connectable to the second electrical contact portion and arranged on a side opposite to the first device-side connecting portion in a length direction of the first terminal fitting. The first electrical contact portion and the first device-side connecting portion are constituted by a single component. The first electrical contact portion is (Continued)

relatively displaceable with respect to the first device-side connecting portion.

11 Claims, 9 Drawing Sheets

(56) References Cited

U.S. PATENT DOCUMENTS

2017/0310032 A1 10/2017 Sasaki et al.
2020/0395703 A1 12/2020 Shimizu

FOREIGN PATENT DOCUMENTS

| | | |
|---|---|---|
| JP | 2015-222621 A | 12/2015 |
| JP | 2019-153490 A | 9/2019 |
| JP | 2020-043002 A | 3/2020 |
| WO | 2021/085542 A1 | 5/2021 |

CONNECTOR AND CONNECTOR DEVICE

CROSS REFERENCE TO RELATED APPLICATIONS

This application is a national phase of PCT application No. PCT/JP2021/041509, filed on 11 Nov. 2021, which claims priority from Japanese patent application Nos. 2020-188801 and 2021-137461, filed on 12 Nov. 2020 and 25 Aug. 2021, respectively, all of which are incorporated herein by reference.

TECHNICAL FIELD

The present disclosure relates to a connector and a connector device.

BACKGROUND

Conventionally, a structure has been adopted which, to electrically connect in-vehicle devices such as a motor and an inverter, connects a connector for external connection provided in one device and a connector for external connection provided in the other device via a wiring harness. In recent years, a connector device has been proposed which directly connects connectors for external connection of both devices to cope with requests such as a reduction in the number of components and space saving.

For example, in a connector device disclosed in Patent Document 1, a connector provided in one device includes a terminal fitting, a connector housing and a supporting member, and the terminal fitting includes an electrical contact portion to be connected to a mating connector, a device-side connecting portion to be connected to an in-vehicle device and an electrical coupling portion for coupling those portions. The supporting member supports the electrical contact portion displaceably in the connector housing. Thus, even if the electrical contact portion of the connector is shifted in position from that of the mating connector, the electrical contact portion supported by the supporting member is displaced and deflected in the connector housing, whereby a position shift is absorbed and the electrical contact portions of the both connectors are electrically connected.

PRIOR ART DOCUMENT

Patent Document

Patent Document 1: JP 2010-225488 A

SUMMARY OF THE INVENTION

Problem to be Solved

In the connector device of Patent Document 1, the terminal fitting in the connector of the one device is provided by joining a plurality of members including the electrical coupling portion constituted by a braided wire or the like. Further, a structure for holding the supporting member supporting the electrical contact portion displaceably in the connector housing is also necessary. As a result, problems of a large number of components, a complicated structure and an unavoidable cost increase have been inherent.

Accordingly, a connector and a connector device of novel structures are disclosed which enable a reduction in the number of components, the simplification of a structure and a cost reduction.

Means to Solve the Problem

The present disclosure is directed to a connector capable of electrically connecting a first terminal portion of a first in-vehicle device and a mating electrical contact portion of a second in-vehicle device, the connector being provided with a first terminal fitting, and a first connector housing for accommodating the first terminal fitting, the first terminal fitting including a first device-side connecting portion connectable to the first terminal portion and a first electrical contact portion connectable to the mating electrical contact portion and arranged on a side opposite to the first device-side connecting portion in a length direction of the first terminal fitting, the first electrical contact portion and the first device-side connecting portion being constituted by a single component, and the first electrical contact portion being relatively displaceable with respect to the first device-side connecting portion.

The present disclosure is also directed to a connector device for electrically connecting a first terminal portion of a first in-vehicle device and a second terminal portion of a second in-vehicle device, the connector device being provided with a first connector mountable into the first in-vehicle device and a second connector mountable into the second in-vehicle device, the first connector including a first terminal fitting and a first connector housing for accommodating the first terminal fitting, the second connector including a second terminal fitting, the second terminal fitting including a second device-side connecting portion connectable to the second terminal portion and a second electrical contact portion to be connected to the first terminal fitting and arranged on a side opposite to the second device-side connecting portion, the first terminal fitting including a first device-side connecting portion connectable to the first terminal portion and a first electrical contact portion to be connected to the second electrical contact portion and arranged on a side opposite to the first device-side connecting portion in a length direction of the first terminal fitting, the first electrical contact portion and the first device-side connecting portion being constituted by a single component, and the first electrical contact portion being relatively displaceable with respect to the first device-side connecting portion.

Effect of the Invention

According to the connector and the connector device of the present disclosure, it is possible to achieve a reduction in the number of components, the simplification of a structure and a cost reduction.

DETAILED DESCRIPTION TO EXECUTE THE INVENTION

Description of Embodiments of Present Disclosure

Figure 1:
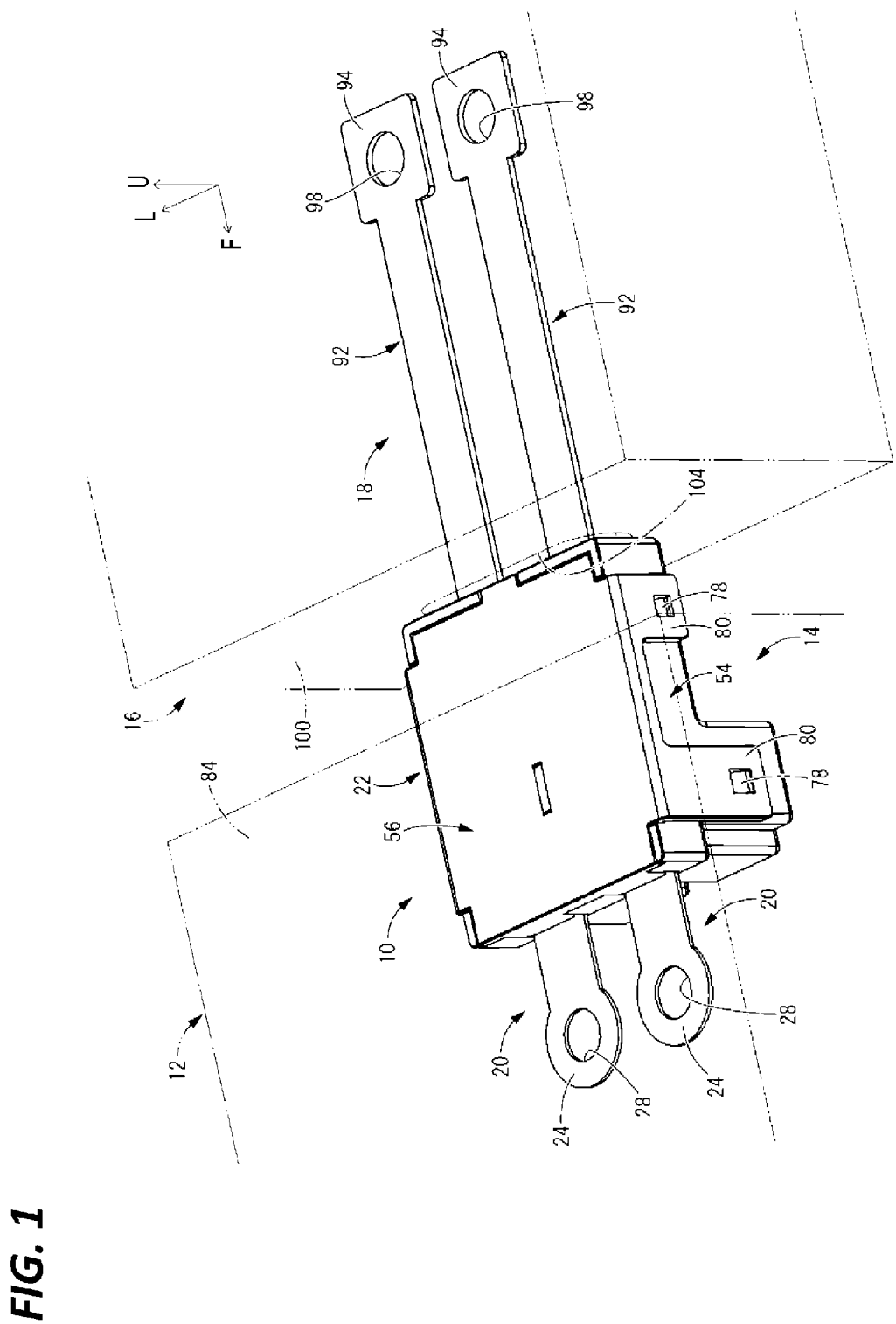
FIG. 1 is an overall perspective view showing a connector device according to one embodiment.

First, embodiments of the present disclosure are listed and described.

(1) The connector of the present disclosure is a connector capable of electrically connecting a first terminal portion of a first in-vehicle device and a mating electrical contact portion of a second in-vehicle device, and provided with a first terminal fitting and a first connector housing for accommodating the first terminal fitting, the first terminal fitting including a first device-side connecting portion connectable to the first terminal portion and a first electrical contact portion connectable to the mating electrical contact portion and arranged on a side opposite to the first device-side connecting portion in a length direction of the first terminal fitting, the first electrical contact portion and the first device-side connecting portion being constituted by a single component, and the first electrical contact portion being relatively displaceable with respect to the first device-side connecting portion.

According to the connector of the present disclosure, a position shift from the mating electrical contact portion can be absorbed, using a displacement of the first electrical contact portion with respect to the first device-side connecting portion. The first electrical contact portion and the first device-side connecting portion are constituted by the single component. Thus, a reduction in the number of components and the simplification of a structure can be advantageously achieved as compared to a conventional structure in which a terminal fitting needs to be constituted by joining a plurality of members including a braided wire and a supporting member for supporting an electrical contact portion and a mechanism for displaceably holding the supporting member in a connector housing are necessary.

(2) Preferably, the first terminal fitting includes a first stretchable portion between the first device-side connecting portion and the first electrical contact portion, and the first electrical contact portion is relatively displaceable with respect to the first device-side connecting portion by resilient deformation of the first stretchable portion. Since the first terminal fitting includes the resiliently deformable first stretchable portion in an intermediate part in the length direction of the first terminal fitting, position shifts of the first electrical contact portion and the mating electrical contact portion can be more advantageously absorbed.

(3) Preferably, the first stretchable portion is formed by bending the first terminal fitting. The first stretchable portion can be easily provided by bending the first terminal fitting and configured without increasing the number of components.

(4) Preferably, a resilient member is provided which is accommodated into the first connector housing, and the resilient member is capable of holding the first electrical contact portion in contact with the mating electrical contact portion and displaceable according to a displacement of the first electrical contact portion. By including the resilient member capable of holding the first electrical contact portion in contact with the mating electrical contact portion, conduction stability between the both electrical contact portions can be more reliably maintained. Further, since the resilient member is accommodated in the first connector housing in a state displaceable according to the displacement of the first electrical contact portion, it is advantageously prevented by the resilient member that a position shift absorbing function is hindered by the displacement of the first electrical contact portion.

(5) Preferably, the resilient member includes a pair of flat plate portions arranged to face each other with a gap therebetween and a coupling plate portion coupling the pair of flat plate portions, and the resilient member is capable of sandwiching the first electrical contact portion and the mating electrical contact portion in a contact state in mutually contacting directions by the pair of flat plate portions. In this way, the structure of the first connector can be further simplified.

(6) Preferably, each of the pair of flat plate portions includes a sandwiching protrusion projecting inward in a facing direction, the sandwiching protrusions are capable of sandwiching the first electrical contact portion and the mating electrical contact portion in the contact state in the mutually contacting directions, and the sandwiching protrusions have an arcuate cross-section. Since the sandwiching protrusions for sandwiching the first electrical contact portion and the mating electrical contact portion have an arcuate cross-section, the first electrical contact portion or the mating electrical contact portion and the flat plate portion are allowed to be inclined.

(7) Preferably, the first electrical contact portion includes a dome-shaped projecting contact point portion, and the contact point portion is capable of contacting the mating electrical contact portion. Since the contact point portion provided at the first electrical contact portion has a dome shape, a contact state between the both electrical contact portions can be stably maintained even if the mating electrical contact portion to be overlapped on the first electrical contact portion is twisted and displaced such as by being rolled.

(8) A connector device of the present disclosure is a connector device for electrically connecting a first terminal portion of a first in-vehicle device and a second terminal portion of a second in-vehicle device, and provided a first connector mountable into the first in-vehicle device and a second connector mountable into the second in-vehicle device, the first connector including a first terminal fitting and a first connector housing for accommodating the first terminal fitting, the second connector including a second terminal fitting, the second terminal fitting including a second device-side connecting portion connectable to the second terminal portion and a second electrical contact portion to be connected to the first terminal fitting and arranged on a side opposite to the second device-side connecting portion, the first terminal fitting including a first device-side connecting portion connectable to the first terminal portion and a first electrical contact portion to be connected to the second electrical contact portion and arranged on a side opposite to the first device-side connecting portion in a length direction of the first terminal fitting, the first electrical contact portion and the first device-side connecting portion being constituted by a single component, and the first electrical contact portion being relatively displaceable with respect to the first device-side connecting portion.

According to the connector device of the present disclosure, a position shift from the second electrical contact portion can be absorbed, using a displacement of the first electrical contact portion with respect to the first device-side connecting portion. The first electrical contact portion and the first device-side connecting portion are constituted by the single component. Thus, a reduction in the number of components and the simplification of a structure can be advantageously achieved as compared to a conventional structure in which a terminal fitting needs to be constituted by joining a plurality of members including a braided wire and a supporting member for supporting an electrical contact portion and a mechanism for displaceably holding the supporting member in a connector housing are necessary.

(9) Preferably, the second electrical contact portion and the second device-side connecting portion are constituted by a single component, and the second electrical contact portion is relatively displaceable with respect to the second device-side connecting portion. A position shift from the first electrical contact portion can be absorbed, using a displacement of the second electrical contact portion with respect to the second device-side connecting portion. The second electrical contact portion and the second device-side connecting portion are constituted by the single component. Therefore, a reduction in the number of components and the simplification of the structure can be more advantageously achieved.

(10) Preferably, the second electrical contact portion projects to outside of the second in-vehicle device with the second connector mounted in the second in-vehicle device. Since the second electrical contact portion projects to the outside of the second in-vehicle device in a state relatively displaceable with respect to the second device-side connecting portion, position shifts between the respective electrical contact portions of the first and second connectors can be more advantageously absorbed and connection between the both electrical contact portions can be stably realized, using displacements of the both first and second electrical contact portions at the time of connecting the first and second connectors.

(11) Preferably, the first terminal fitting includes a first stretchable portion between the first device-side connecting portion and the first electrical contact portion, the first electrical contact portion is relatively displaceable with respect to the first device-side connecting portion by resilient deformation of the first stretchable portion, and the first stretchable portion is formed by bending the first terminal fitting. Since the first terminal fitting includes the resiliently deformable first stretchable portion in an intermediate part in the length direction of the first terminal fitting, position shifts of the first and second electrical contact portions can be more advantageously absorbed. The first stretchable portion can be easily provided by bending the first terminal fitting and configured without increasing the number of components.

(12) Preferably, the first terminal fitting is thinner than the second terminal fitting. Since the first terminal fitting is thinner than the second terminal fitting, the first stretchable portion is easily resiliently deformed.

(13) Preferably, a holding force between the first and second electrical contact portions is set to be larger than a force necessary for the resilient deformation of the first stretchable portion. For example, when the first and second in-vehicle devices are relatively displaced due to vibration or the like during the travel of a vehicle, the first stretchable portion is resiliently deformed earlier than relative displacements of the first and second electrical contact portions in the length direction of the first terminal fitting. Thus, the wear of the first and second electrical contact portions is suppressed.

(14) Preferably, the holding force between the first and second electrical contact portions includes a friction force between members contacting in a direction intersecting the length direction of the first terminal fitting. The holding force between the first and second electrical contact portions can be set to be larger than the force necessary for the resilient deformation of the first stretchable portion, using the friction force.

(15) Preferably, either one of the first and second electrical contact portions includes a fitting portion, the other of the first and second electrical contact portions includes a fit portion, the fitting portion is fit to the fit portion in a direction intersecting the length direction of the first terminal fitting, and the holding force between the first and second electrical contact portions includes an engaging force between the fitting portion and the fit portion engaged in the length direction of the first terminal fitting. The holding force between the first and second electrical contact portions can be set to be larger than the force necessary for the resilient deformation of the first stretchable portion, using the engaging force between the fitting portion and the fit portion engaged in the length direction of the first terminal fitting. The holding force between the first and second electrical contact portions can be stably set to be large as compared to the case where the engaging force between the fitting portion and the fit portion is not used.

Details of Embodiment of Present Disclosure

Specific examples of a connector and a connector device of the present disclosure are described below with reference to the drawings. Note that the present disclosure is not limited to these illustrations, but is represented by claims and intended to include all changes in the scope of claims and in the meaning and scope of equivalents.

Embodiment

Figure 2:
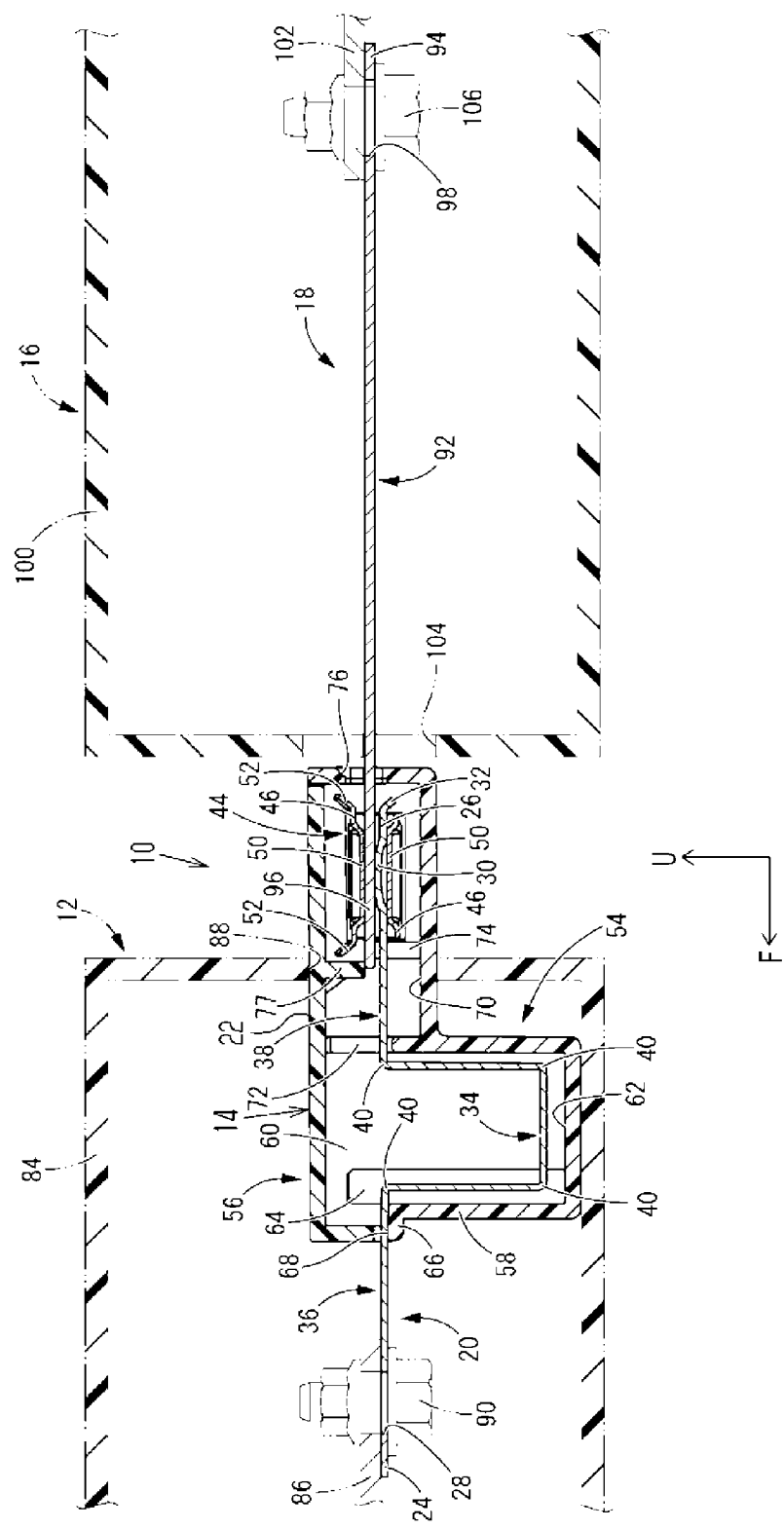
FIG. 2 is a longitudinal section of the connector device shown in FIG. 1.

Hereinafter, a connector device 10 of one embodiment of the present disclosure is described with reference to FIGS. 1 to 10. As shown in FIGS. 1 and 2, the connector device 10 is provided with a first connector 14 as a connector provided in a first in-vehicle device 12 and a second connector 18 provided in a second in-vehicle device 16. The connector device 10 can be arranged in an arbitrary orientation, but an upward direction, a leftward direction and a forward direction are described below based on an upward direction, a leftward direction and a forward direction shown in figures. Further, for a plurality of identical members, only some members may be denoted by a reference sign and the other members may not be denoted by the reference sign.

<First Terminal Fittings 20>

Figure 3:
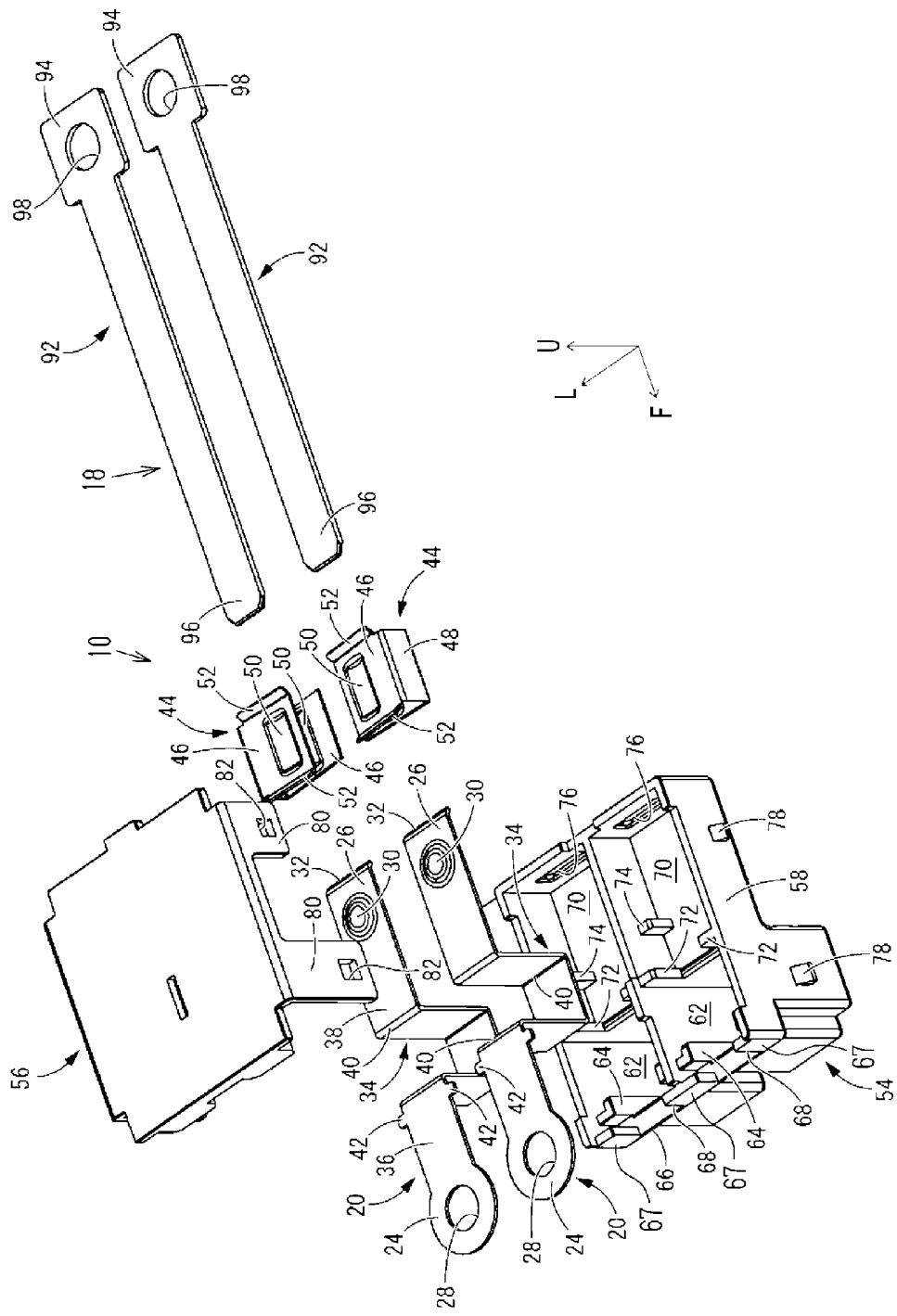
FIG. 3 is an exploded perspective view of the connector device shown in FIG. 1.

The first connector 14 is structured such that two first terminal fittings 20, 20 are accommodated in a first connector housing 22. That is, the first connector 14 is provided with the two first terminal fittings 20, 20 and the first connector housing 22 for accommodating the first terminal fittings 20, 20. As also shown in FIG. 3, the first terminal fitting 20 is a busbar made of a plate-like electrically conductive metal material. The first terminal fitting 20 is a resilient member allowed to be resiliently deflected and deformed in a thickness direction. The first terminal fitting 20 is long in a front-rear direction, a front end part serves as a first device-side connecting portion 24 and a rear end part serves as a first electrical contact portion 26. That is, the first terminal fitting 20 includes the first device-side connecting portion 24 and the first electrical contact portion 26 arranged on a side opposite to the first device-side connecting portion 24 in a length direction of the first terminal fitting 20. The first device-side connecting portion 24 is formed into an annular disk shape and includes a first bolt hole 28 penetrating in a vertical direction, which is the thickness direction. The first electrical contact portion 26 includes a dome-shaped contact point portion 30 projecting upward. The contact point portion 30 may be formed by making the first electrical contact portion 26 partially thicker, but is formed by press-working to be partially convex upward and the lower surface thereof is concavely dented. A rear end edge part of the first electrical contact portion 26 serves as a guiding portion 32 inclined downward toward the rear.

A first stretchable portion 34 is provided between the first device-side connecting portion 24 and the first electrical contact portion 26 in the first terminal fitting 20. The first stretchable portion 34 is formed by bending the first terminal fitting 20 in a plate thickness direction. In other words, the first stretchable portion 34 is formed by bending the first terminal fitting 20 about axes along a width direction of the first terminal fitting 20. Note that the width direction of the first terminal fitting 20 is a lateral direction. Further, the width direction of the first terminal fitting 20 is a direction orthogonal to the length direction of the first terminal fitting 20. Further, the width direction of the first terminal fitting 20 is a direction orthogonal to the plate thickness direction of the first terminal fitting 20. More particularly, the first stretchable portion 34 is in the form of a groove open upward and having a U-shaped cross-section, and connected to the first device-side connecting portion 24 and the first electrical contact portion 26 on an opening end part of this groove. In short, the first terminal fitting 20 includes the first stretchable portion 34, a device-side part 36 located forward of the first stretchable portion 34 and having the first device-side connecting portion 24, and a contact-side part 34 located rearward of the first stretchable portion 34 and having the first electrical contact portion 26. In other words, the first terminal fitting 20 includes the first stretchable portion 34 in an electrical coupling portion, which is an intermediate region connecting the first device-side connecting portion 24 and the first electrical contact portion 26. A pair of positioning pieces 42, 42 project outward in the lateral direction between the first device-side connecting portion 24 and the first stretchable portion 34 in the device-side part 36.

The first stretchable portion 34 of this embodiment includes a pair of vertical walls expanding orthogonally to the front-rear direction and a bottom wall connecting the lower ends of the vertical walls. Since these vertical walls and bottom wall are respectively in the form of flat plates, bent parts 40 are provided at four positions. However, the specific shape of the first stretchable portion 33 is not limited. For example, in a lateral view, the vertical walls and the bottom wall may be formed into a curved shape to be smoothly connected without forming any angle, an expanded shape or contracted shape in which a facing distance between the vertical walls changes in the vertical direction, a V shape free from the bottom wall or the like. Heights in the vertical direction of the pair of vertical walls may be different from each other. In that case, for example, in an initial shape of the first terminal fitting 20 not deformed by the action of an external force, the first device-side connecting portion 24 and the first electrical contact portion 26 are arranged at mutually different positions in the vertical direction. Note that the bending of the first terminal fitting 20 is not necessarily limited to the bending of the first terminal fitting at an angle. For example, the bending of the first terminal fitting 20 is realized also by smooth nonangular curving. Therefore, the first stretchable portion may be, for example, formed into a curved chevron shape or a wavy curved shape in which convex curves and concave curves are alternately connected.

The first terminal fitting 20 is stretchable to change a distance in the front-rear direction, which is a separation distance between the first device-side connecting portion 24 and the first electrical contact portion 26, by the resilient deformation of the first stretchable portion 34. That is, the first terminal fitting 20 is formed by a plate material resiliently deformable in the thickness direction, whereby the angles of the bent parts 40 at the four positions in the first stretchable portion 34 can be elastically changed. By angle changes of the bent parts 40, the first stretchable portion 34 is stretched to change a width in the front-rear direction of an upper opening. Thus, the distance in the front-rear direction between the first device-side connecting portion 24 and the first electrical contact portion 26 connected to the upper end edge of the first stretchable portion 34 changes. That is, the first electrical contact portion 26 is relatively displaceable with respect to the first device-side connecting portion 24 by the resilient deformation of the first stretchable portion 34.

In the first terminal fitting 20, relative movements of the first device-side connecting portion 24 and the first electrical contact portion 26 in the vertical direction, accompanying a relative angle change of the device-side part 36 and the contact-side part 38, are also allowed by the deformation of the first stretchable portion 34. Note that the relative movements of the first device-side connecting portion 24 and the first electrical contact portion 26 in the vertical direction can be also allowed by the resilient deformation of the device-side part 36 and the contact-side part 38 in the thickness direction.

The first stretchable portion 34 is constituted by the pair of vertical walls and a horizontal wall in the form of flat plates, and the bent parts 40 at the four positions are respectively bent substantially at a right angle. Thus, as compared to the case where the entire first stretchable portion is smoothly curved, the first stretchable portion 34 is easily extended and contracted by angle changes between the vertical walls and the horizontal wall or an angle change between the vertical wall and the device-side part 36 or the contact-side part 38.

The first stretchable portion 34 allowing relative displacements of the first device-side connecting portion 24 and the first electrical contact portion 26 in the front-rear direction and vertical direction as described above can be easily provided by bending the first terminal fitting 20 constituted by a busbar, which is a single component, in the plate thickness direction. Moreover, since the first stretchable portion 34 is integrally provided by a part of the first terminal fitting 20, an increase in the number of components is avoided and a cost reduction is expected.

<Leaf Spring Clip 44>

A leaf sprig clip 44 serving as a resilient member is mounted on the first electrical contact portion 26 of the first terminal fitting 20. The leaf sprig clip 44 includes a pair of flat plate portions 46, 46 in the form of rectangular plates facing each other in the vertical direction with a gap therebetween and a coupling plate portion 48 coupling the pair of flat plate portions 46 to each other at one side edge parts (first side edge parts) in the lateral direction. The leaf sprig clip 44 is made of a resilient material such as a metal. In the leaf sprig clip 44, a facing distance between the pair of flat plate portions 46, 46 at a position distant from the first side edge parts is changeable by elastic angle changes between the flat plate portions 46, 46 and the coupling plate portion 48. The leaf sprig clip 4 may be formed of an electrically insulating material, but is preferably formed of an electrically conductive material.

Each of the pair of flat plate portions 46, 46 includes a sandwiching protrusion 50 projecting inward in a facing direction. The sandwiching protrusion 50 extends in the front-rear direction while having an arcuate cross-section. The sandwiching protrusion 50 can be, for example, formed by partially denting the flat plate portion 46 through pressworking, similarly to the contact point portion 30 of the first terminal fitting 20. The upper flat plate portion 46 is provided with a pair of guide pieces 52, 52 projecting outward in the front-rear direction. The guide pieces 52, 52 are inclined upward toward projecting tips from the flat plate portion 46. The guide piece 52 may be provided only on a rear side of the flat plate portion 46 to obtain a function of guiding a second terminal fitting 92 to be described later. The guide pieces 52 may be provided on both front and rear sides of the flat plate portion 46. If the guide pieces 52 are provided on both front and rear sides of the flat plate portion 46, a pair of the left and right leaf sprig clips 44 can be commonly used.

The leaf sprig clip 44 is mounted on the first electrical contact portion 26 of the first terminal fitting 20 by inserting the first electrical contact portion 26 of the first terminal fitting 20 into between the pair of flat plate portions 46, 46 facing each other. The leaf sprig clip 44 may be fixed to the first terminal fitting 20, for example, by fixing the lower flat plate portion 46 to the lower surface of the first electrical contact portion 26. In this embodiment, the leaf spring clip 44 is not particularly positioned with respect to the first terminal fitting 20. The leaf sprig clip 44 is prevented from being separated from the first terminal fitting 20 by being accommodated into the first connector housing 22 to be described later.

<First Connector Housing 22>

The first connector housing 22 is in the form of a hollow box as a whole, and structured by combining a first member 54 and a second member 56 in the vertical direction. The first member 54 is in the form of a bottomed tube open upward as a whole and includes a peripheral wall 58 in the form of a rectangular tube and a partition wall portion 60 expanding orthogonally to the lateral direction in a lateral center. Since the first member 54 is bilaterally symmetrical with respect to the partition wall portion 60, one of left and right structures with respect to the partition wall portion 60 is described here. A facing distance in the lateral direction between the peripheral wall 58 and the partition wall portion 60 of the first member 54 is larger than a width in the lateral direction of the first terminal fitting 20.

The first member 54 includes a first accommodation recess 62 for accommodating the first stretchable portion 34 of the first terminal fitting 20. Positioning protrusions 64 projecting upward along the peripheral wall 58 from the bottom wall of the first member 54 are provided in both end parts in the lateral direction in a front end part of the first accommodation recess 62. A facing distance in the lateral direction between the pair of positioning protrusions 64, 64 of the first accommodation recess 62 is substantially equal to a width in the lateral direction of the first stretchable portion 34.

As shown in FIG. 2, a terminal receiving portion 66 projecting forward at the upper end of the first accommodation recess 62 is provided forward of the first accommodation recess 62 in the first member 54. As shown in FIG. 3, a front part of the peripheral wall 58 of the first member 54 includes projecting portions 67 projecting upward from the front end of the terminal receiving portion 66. In other words, the terminal receiving portion 66 is provided in a stepwise manner in an intermediate part in the vertical direction of the front part of the peripheral wall 58 of the first member 54. The projecting portions 67, which are parts projecting upward from the terminal receiving portion 66 in the peripheral wall 58, are facing the positioning protrusions 64 of the first accommodation recess 62 from front. A facing distance in the front-rear direction between the projecting portions 67 and the positioning protrusions 64 is substantially equal to a width direction in the front-rear direction of the positioning pieces 42 of the first terminal fitting 20. The projecting portions 67 are partially provided at both ends and a center in the lateral direction of the first member 54, and constitute device-side insertion portions 68 penetrating in the front-rear direction.

A second accommodation recess 70 for accommodating the first electrical contact portion 26 of the first terminal fitting 20 is formed behind the first accommodation recess 62 in the first member 54. The first accommodation recess 62 has a larger vertical depth than the second accommodation recess 70 to enable the accommodation of the first stretchable portion 34 projecting further downward than the first electrical contact portion 26. A pair of first position defining portions 72, 72 projecting on the surfaces of the peripheral wall 58 and the partition wall portion 60 of the first member 54 facing each other in the lateral direction are provided on a boundary part between the first and second accommodation recesses 62, 70. A distance in the lateral direction between the first position defining portions 72 and 72 is substantially equal to a lateral width of the contact-side part 38 in the first terminal fitting 20. Further, a pair of first position defining portions 74, 74 projecting on the surfaces of the peripheral wall 58 and the partition wall portion 60 facing each other in the lateral direction in the second accommodation recess 70 are provided behind the first position defining portions 72. A distance in the lateral direction between the second position defining portions 74 and 74 is substantially equal to a distance in the lateral direction between the first position defining portions 72 and 72.

In the peripheral wall 58, a pair of insertion windows 76, 76 penetrating in the front-rear direction are formed in a part constituting rear wall portions of the second accommodation recesses 70. The insertion window 76 has such an opening shape that a front end part of the second terminal fitting 92 to be described later is insertable through the insertion window 76. The insertion window 76 has a hole cross-section larger in the vertical direction and lateral direction than a cross-section of the second terminal fitting 92 along a direction orthogonal to the front-rear direction. The pair of insertion windows 76, 76 are located on laterally outer sides of the partition wall portion 60. The second accommodation recess 70 is open to outside through the insertion window 76.

Locking claws 78 are formed on the lateral outer surfaces of the peripheral wall 58. The locking claw 78 projects outward in the lateral direction from the peripheral wall 58. The locking claw 78 has a right triangular cross-section with a lower side substantially orthogonal to the vertical direction. A projecting height of the locking claw 78 is reduced toward an upper side. In this embodiment, two locking claws 78 are disposed at positions separated in the front-rear direction. Those two locking claws 78 are respectively provided on each of both left and right sides of the first member 54. The number and arrangement of the locking claws 78 are not particularly limited.

As shown in FIG. 2, the second member 56 is in the form of a plate capable of covering an upper opening of the first member 54, and includes a third position defining portion 77 projecting downward. As shown in FIG. 3, locking pieces 80 projecting downward are provided on both ends in the lateral direction of the second member 56. The locking piece 80 is plate-like and allowed to be deflected and deformed in the lateral direction, which is a thickness direction. The locking piece 80 is formed with a claw insertion hole 82 corresponding to the locking claw 78 of the first member 54 and penetrating in the lateral direction. In this embodiment, two locking piece 80 are disposed at positions separated in the front-rear direction. Those two locking pieces 80 are respectively provided on each of both left and right sides of the second member 56. The number and arrangement of the locking pieces 80 can be changed as appropriate to correspond to the locking claws 78.

By overlapping the second member 56 on the upper surface of the first member 54, the upper opening of the first member 54 is closed by the second member 56 and the first connector housing 22 of a hollow structure provided with a space inside is configured. By locking the locking pieces 80 of the second member 56 to the locking claws 78 of the first member 54, the first and second members 54, 56 are positioned to each other.

<Assembling of First Connector 14>

The pair of first terminal fittings 20, 20 and the pair of leaf spring clips 44, 44 are accommodated into the first connector housing 22. That is, the first stretchable portions 34 of the first terminal fittings 20 are inserted into the first accommodation recesses 62 of the first member 54 from above and the contact-side parts 38 of the first terminal fitting 20 are inserted into the second accommodation recesses 70 of the first member 54 from above. The device-side parts 36 of the first terminal fittings 20 have rear end parts overlapped and supported on the upper surface of the terminal receiving portion 66 in the device-side insertion portions 68 of the first member 54, and the first device-side connecting portions 24 are located forward of the first member 54 through the device-side insertion portions 68. The leaf spring clips 44 are accommodated in the second accommodation recesses 70 of the first member 54 while being mounted on the first electrical contact portions 26 of the first terminal fittings 20. Then, the second member 56 is fixed to the first member 54 to close the upper opening of the first member 54 accommodating the first terminal fittings 20 and the leaf spring clips 44. In this way, the first connector 14 structured to accommodate the first terminal fittings 20 and the leaf spring clips 44 in the first connector housing 22 is configured.

The first terminal fitting 20 is positioned in the lateral direction with respect to the first member 54 by disposing the first stretchable portion 34 between the pair of left and right positioning protrusions 64 and 64. Further, the first terminal fitting 20 is positioned in the lateral direction with respect to the first member 54 by inserting the device-side part 36 through the device-side insertion portion 68. By inserting the positioning pieces 42 provided on the device-side part 36 into between the projecting portions 67 and the positioning protrusions 64 facing in the front-rear direction, the first terminal fitting 20 is positioned in the front-rear direction with respect to the first member 54. Further, the first terminal fitting 20 is positioned in the lateral direction with respect to the first member 54 by disposing the contact-side part 38 between the pair of left and right first position defining portions 72, 72. Furthermore, the first terminal fitting 20 is positioned in the lateral direction with respect to the first member 54 by disposing the contact-side part 38 between the pair of left and right second position defining portions 74, 74.

Note that, with the first terminal fitting 20 positioned with respect to the first connector housing 22 as described above, the first stretchable portion 34 of the first terminal fitting 20 accommodated in the first accommodation recess 62 is separated from the inner surface of the first accommodation recess 62 as shown in FIG. 2. In this way, the first stretchable portion 34 is allowed to be deformed and displaced in the first connector housing 22. In this way, the extension and contraction of the first stretchable portion 34 are not limited by the first connector housing 22. Further, the contact-side part 38 of the first terminal fitting 20 is positioned in the lateral direction with respect to the first connector housing 22 and allowed to be deformed and displaced in the vertical direction and front-rear direction. These allow the first electrical contact portion 26 accommodated in the first connector housing 22 to be displaced in the vertical direction and front-rear direction in the first connector housing 22.

The leaf spring clip 44 is not fixed with respect to the first connector housing 22 and is displaceable in the first connector housing 22 according to a displacement of the first electrical contact portion 26. The leaf spring clip 44 is disposed behind the second position defining portions 74 and displacement amounts in the front-rear direction and lateral direction with respect to the first terminal fitting 20 are limited by the first member 54. In this way, the detachment of the leaf spring clip 44 from the first terminal fitting 20 is prevented. A forward displacement amount of the leaf spring clip 44 with respect to the first connector housing 22 is limited also by the contact of the leaf spring clip 44 with the third position defining portion 77 provided in the second member 56.

<First In-Vehicle Device 12>

The first connector 14 structured as just described is provided in the first in-vehicle device 12 as shown in FIG. 2. The first in-vehicle device 12 is, for example, a motor of an automotive vehicle and structured to accommodate first connection terminals 86 serving as first terminal portions inside a first case 84. The first case 84 is formed with a first window portion 88 penetrating through a rear wall portion in the front-rear direction. A front part of the first connector housing 22 is accommodated in the first case 84. The first device-side connecting portions 24 of the first terminal fittings 20 projecting forward from the first connector housing 22 are overlapped on the first connection terminals 86. The overlapped first device-side connecting portions 24 and first connection terminals 86 are fixed in an electrically connected state by first bolts 90 inserted through the first bolt holes 28 of the first device-side connecting portions 24. In this way, the first connector 14 is provided in the first in-vehicle device 12 in a state where the first terminal fittings 20 are conductive with the first connection terminals 86 of the first in-vehicle device 12. The first connector housing 22 projects rearward from the first case 84 through the first window portion 88.

<Second Connector 18 (Second Terminal Fittings 92)>

The second connector 18 is provided with the second terminal fittings 92. As also shown in FIG. 3, the second terminal fitting 92 is a busbar plate-like and made of electrically conductive metal or the like, similarly to the first terminal fitting 20. Note that the second terminal fitting 92 is thicker than the first terminal fitting 20. In other words, the first terminal fitting 20 is thinner than the second terminal fitting 92. Further, the second terminal fitting 92 is longer in the front-rear direction than the first terminal fitting 20. The second terminal fitting 92 is allowed to be resiliently deflected and deformed in the vertical direction, which is a thickness direction. In this way, the second terminal fitting 92 is allowed to be deformed in the thickness direction by a simple configuration by the busbar, which is a single component. A rear end part of the second terminal fitting 92 includes a second device-side connecting portion 94, and a front end part thereof includes a second electrical contact portion 96 serving as a mating electrical contact portion. The second device-side connecting portion 94 is wider in the lateral direction than the other part of the second terminal fitting 92, and includes a second bolt hole 98 penetrating in the vertical direction. A front end part of the second electrical contact portion 96 is formed into a tapered shape to be narrower in the lateral direction toward the front. Note that a front end part of the second electrical contact portion 96 may be thinner in the vertical direction toward the front.

<Second In-Vehicle Device 16>

The second device-side connecting portion 94 of the second terminal fitting 92 constituting the second connector 18 is connected to the second in-vehicle device 16 as shown in FIG. 2. The second in-vehicle device 16 is a device to be electrically connected to the first in-vehicle device 12 and, for example, an inverter or ECU (Electric Control Unit) of the automotive vehicle. The second in-vehicle device 16 is structured to accommodate second connection terminals 102 serving as second terminal portions inside a second case 100 serving as a casing. The second case 100 is formed with a second window portion 104 serving as an insertion hole penetrating through a front wall portion in the front-rear direction. Then, the second terminal fittings 92 are inserted through the second window portion 104 of the second case 100 of the second in-vehicle device 16. The second device-side connecting portions 94 of the second terminal fittings 92 are overlapped on the second connection terminals 102. The second device-side connecting portions 94 and the second connection terminals 102 are fixed in an electrically connected state by second bolts 106 inserted through the second bolt holes 98. In this way, the second connector 18 is provided in the second in-vehicle device 16 in a state where the second terminal fittings 92 are conductive with the second connection terminals 102 of the second in-vehicle device 16. The second electrical contact portions 96 project forward to outside from the second case 100 thought the second window portion 104. The second electrical contact portion 96 is made displaceable in the vertical direction by the resilient deflection and deformation of an intermediate region of the second terminal fitting 92 located between the second device-side connecting portion 94 and the second electrical contact portion 96. In other words, the second electrical contact portion 96 is relatively displaceable with respect to the second device-side connecting portion 94 by the resilient deformation of the second terminal fitting 92.

<Connection of First Connector 14 and Second Connector 18>

Figure 4:
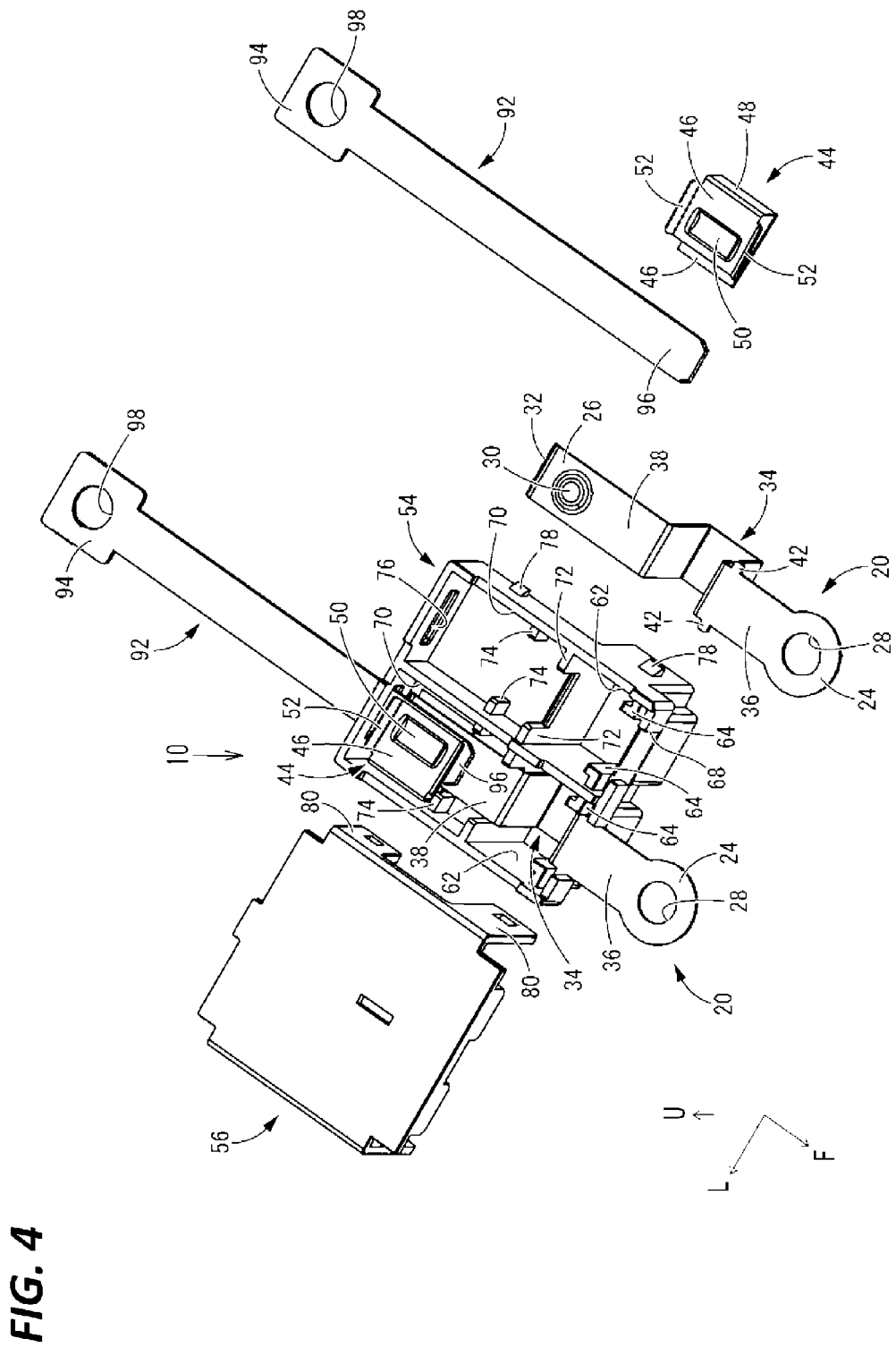
FIG. 4 is an exploded perspective view of the connector device shown in FIG. 3 showing a connected state of a first terminal and a second terminal.
Figure 5:
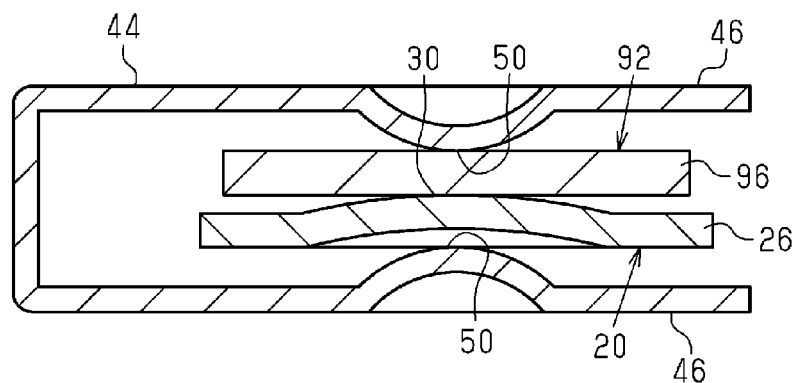
FIG. 5 is a partial section of the connector device shown in FIG. 1.

A front end part of the second terminal fitting 92 extending out forward through the second window portion 104 from the second case 100 of the second in-vehicle device 16 is inserted into the insertion window 76 of the first connector housing 22. The second electrical contact portion 96 of the second terminal fitting 92 inserted into the first connector housing 22 is inserted between the upper flat plate portion 46 of the leaf spring clip 44 and the first electrical contact portion 26 of the first terminal fitting 20 in the vertical direction as shown in FIGS. 2 and 4. The first and second electrical contact portions 26, 96 are held in a state pressed against each other by the resilience of the leaf spring clip 44. In other words, the first and second electrical contact portions 26, 96 are held in a contact state by the resilience of the leaf spring clip 44. In particular, the first and second electrical contact portions 26, 96 in the state contacting in the vertical direction are sandwiched in the vertical direction by the pair of flat plate portions 46. More particularly, as shown in FIG. 5, the first and second electrical contact portions 26, 96 in the state contacting in the vertical direction are sandwiched in the vertical direction by the sandwiching protrusions 50 of the pair of flat plate portions 46. In this way, the first and second terminal fittings 20, 92 are conductively connected. In this way, the first and second in-vehicle devices 12, 16 are electrically connected by the connector device 10 composed of the first and second connectors 14, 18.

Further, a holding force between the first and second electrical contact portions 26, 96 held as described above is set to be larger than a force necessary for the resilient deformation of the first stretchable portion 34. In other words, when the first and second in-vehicle devices 12, 16 in a state assembled with each other are relatively displaced due to vibration or the like, the first stretchable portion 34 is set to be resiliently deformed earlier than relative displacements of the first and second electrical contact portions 26, 96 in the front-rear direction. The holding force between the first and second electrical contact portions 26, 96 includes friction forces between members contacting in a direction intersecting the length direction of the first terminal fitting 20. In particular, the holding force between the first and second electrical contact portions 26, 96 includes a friction force between the first and second electrical contact portions 26, 96, a friction force between the first electrical contact portion 26 and the lower flat plate portion 46 and a friction force between the second electrical contact portion 96 and the upper flat plate portion 46. Note that, in FIG. 4, the first and second terminal fittings 20, 92 on one side are connected with the second member 56 of the first connector housing 22 removed from the first member 54. Further, in FIG. 4, the first and second terminal fittings 20, 92 and the leaf spring clip 44 on the other side are shown in a disassembled state.

The rear end surface of the leaf spring clip 44 is constituted by the guide piece 52 and the sandwiching protrusions 50. The rear end surface of the leaf spring clip 44 is formed into an inclined surface extending in the vertical direction toward the rear. In this way, if the second terminal fitting 92 contacts the leaf spring clip 44 from behind, a component force of a contact reaction force acts upward on the leaf spring clip 44, and the upper flat plate portion 46 is moved upward with respect to the first electrical contact portion 26 of the first terminal fitting 20. As a result, a gap is formed between the upper flat plate portion 46 of the leaf spring clip 44 and the first electrical contact portion 26, and the second electrical contact portion 96 of the second terminal fitting 92 can be inserted into this gap.

If position shifts occur due to a dimensional error or the like between the first and second in-vehicle devices 12, 16 in connecting the first in-vehicle device 12 provided with the first connector 14 and the second in-vehicle device 16 provided with the second connector 18, these position shifts are allowed by the connector device 10.

That is, if the positions of the first and second in-vehicle devices 12, 16 are shifted in the vertical direction, the first terminal fitting 20 in the first connector 14 is resiliently deformed at the first stretchable portion 34, whereby the first electrical contact portion 26 relatively moves in the vertical direction with respect to the first device-side connecting portion 24 up to a position where the first and second electrical contact portions 26, 96 can be connected. Note that the position shifts in the vertical direction are allowed also by the resilient deformation of at least one of the device-side part 36 and the contact-side part 38 of the first terminal fitting 20 in the thickness direction. Further, since the second terminal fitting 92 is a busbar, the position shifts of the first and second in-vehicle devices 12, 16 in the vertical direction are allowed also by the resilient deformation of the second terminal fitting 92 in the thickness direction.

If relative positions of the first and second in-vehicle devices 12, 16 are shifted in the front-rear direction, the first terminal fitting 20 is resiliently deformed at the first stretchable portion 34, whereby a distance in the front-rear direction between the first device-side connecting portion 24 and the first electrical contact portion 26 changes and position shifts of the first and second in-vehicle devices 12, 16 in the front-rear direction are allowed. Further, since the second terminal fitting 92 extends in the front-rear direction and is inserted into the first connector 14 in the front-rear direction, the position shifts of the first and second in-vehicle devices 12, 16 in the front-rear direction are allowed also by a change in the insertion amount of the second terminal fitting 92 into the first connector 14.

Further, since the second electrical contact portion 96 of the second terminal fitting 92 is in the form of a flat plate, even if the positions of the first and second in-vehicle devices 12, 16 are shifted in the lateral direction, the first and second electrical contact portions 26, 96 can be connected over the width of the second electrical contact portion 96.

Figure 6:
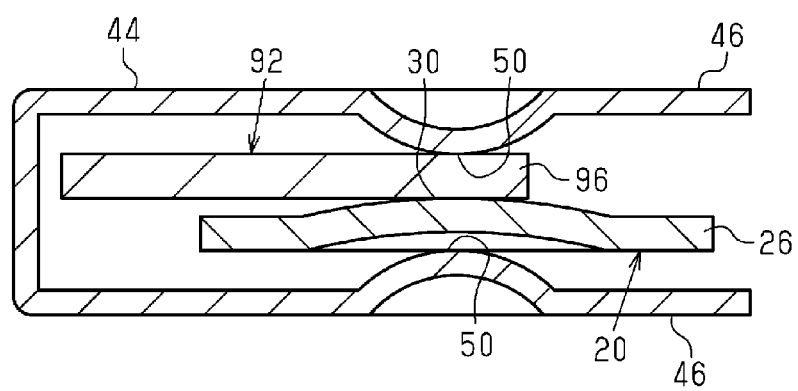
FIG. 6 is a partial section of the connector device shown in FIG. 1.

For example, as shown in FIG. 6, the first and second electrical contact portions 26, 96 are maintained in the connected state even if center positions thereof in the lateral direction are shifted.

Figure 7:
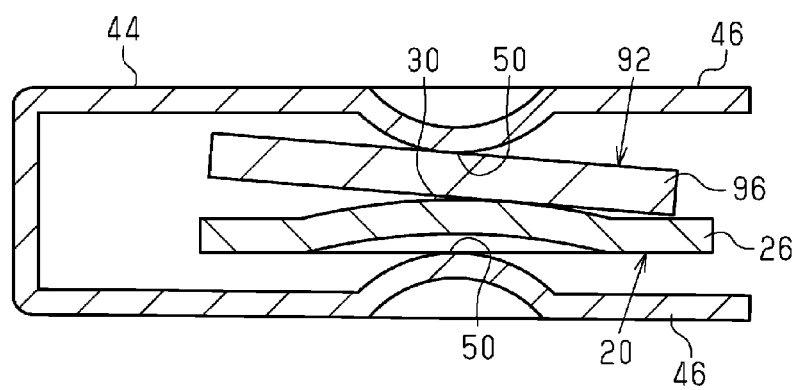
FIG. 7 is a partial section of the connector device shown in FIG. 1.

Further, if the first and second in-vehicle devices 12, 16 are inclined in a circumferential direction about a center axis extending in the front-rear direction, the second electrical contact portion 96 can contact the contact point portion 30 and the first and second electrical contact portions 26, 96 can be connected since the contact point portion 30 of the first electrical contact portion 26 has a dome shape. For example, even if the second electrical contact portion 96 is inclined about the center axis extending in the front-rear direction with respect to the first electrical contact portion 26 as shown in FIG. 7, the connected state of the first electrical contact portion with the contact point portion 30 is maintained. Since the sandwiching protrusions 50 of the leaf spring clip 44 have an arcuate circular cross-section, the first or second electrical contact portion 26, 96 and the leaf spring clip 44 are allowed to be inclined. Also by that, the first and second electrical contact portions 26, 96 can be set in a contact state to be inclined about the center axis extending in the front-rear direction.

As just described, according to the connector device 10, since the first terminal fittings 20 of the first connector 14 are busbars, relative position shifts of the first and second in-vehicle devices 12, 16 in a vehicle mounted state are allowed by the deformation or the like of the first terminal fittings 20. Further, in this embodiment, since the second terminal fittings 92 of the second connector 18 are also busbars, the relative position shifts of the first and second in-vehicle devices 12, 16 in the vehicle mounted state are allowed by the deformation or the like of the second terminal fittings 92. Moreover, as described above, the relative position shifts of the first and second in-vehicle devices 12, 16 are allowed with a large degree of freedom including twists and the like by the contact point portions 30, the sandwiching protrusions 50 of the leaf spring clips 44 and the like. Therefore, the damage of the connector device 10, the first in-vehicle device 12, the second in-vehicle device 16 and the like due to the continuous action of stresses associated with the position shifts, a connection failure of the first and second connectors 14, 18 and the like are prevented.

Since the connector device 10 allows relative displacements of the first and second in-vehicle devices 12, 16, the relative displacements of the first and second in-vehicle devices 12, 16 are allowed by the connector device 10 also when vibration due to the travel of the vehicle or the like is applied between the first and second in-vehicle devices 12, 16. Therefore, the damage of the connector device 10, the first in-vehicle device 12, the second in-vehicle device 16 and the like due to an input during travel is avoided. Particularly, in the structure of this embodiment provided with the first stretchable portions 34, the relative displacements of the first and second in-vehicle devices 12, 16 are more easily allowed by the deformation of the first stretchable portions 34, and followability to a vibration input can be improved.

The leaf spring clip 44 for holding the first electrical contact portion 26 of the first terminal fitting 20 and the second electrical contact portion 96 of the second terminal fitting 92 in the contact state is displaceable inside the first connector housing 22. In this way, relative displacements of the first device-side connecting portion 24 and the first electrical contact portion 26 and those of the second device-side connecting portion 94 and the second electrical contact portion 96 are allowed without being hindered by the leaf spring clip 44. Therefore, relative displacements associated with position shifts of the first and second in-vehicle devices 12, 16 and a vibration input can be effectively allowed by the connector device 10. Further, relative displacements of the first and second electrical contact portions 26, 96 can be allowed while stably maintaining the contact state of the first and second electrical contact portions 26, 96 by a simple structure of disposing the leaf spring clip 44 in the first connector housing 22 with a gap therebetween.

Next, effects of the above embodiment are complemented.

The first electrical contact portion 26 is relatively displaceable with respect to the first device-side connecting portion 24.

Figure 8:
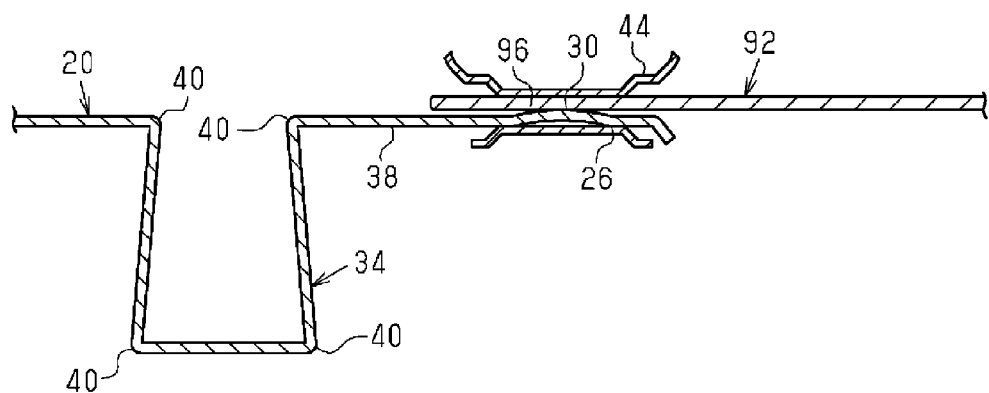
FIG. 8 is a partial section of the connector device shown in FIG. 1.

For example, as shown in FIG. 8, the angles of the bent parts 40 at the four positions of the first stretchable portion 34 can be changed by resilient deformation in the first terminal fitting 20. In this way, the first electrical contact portion 26 is relatively displaceable in the front-rear direction with respect to the first device-side connecting portion 24.

Figure 9:
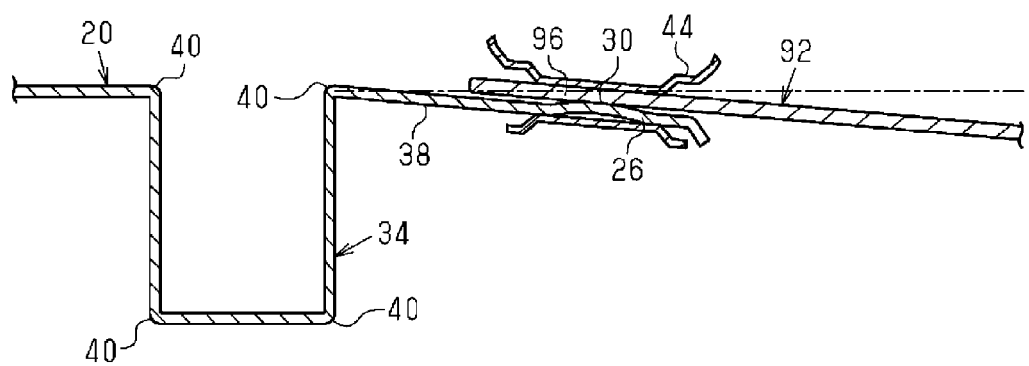
FIG. 9 is a partial section of the connector device shown in FIG. 1.
Figure 10:
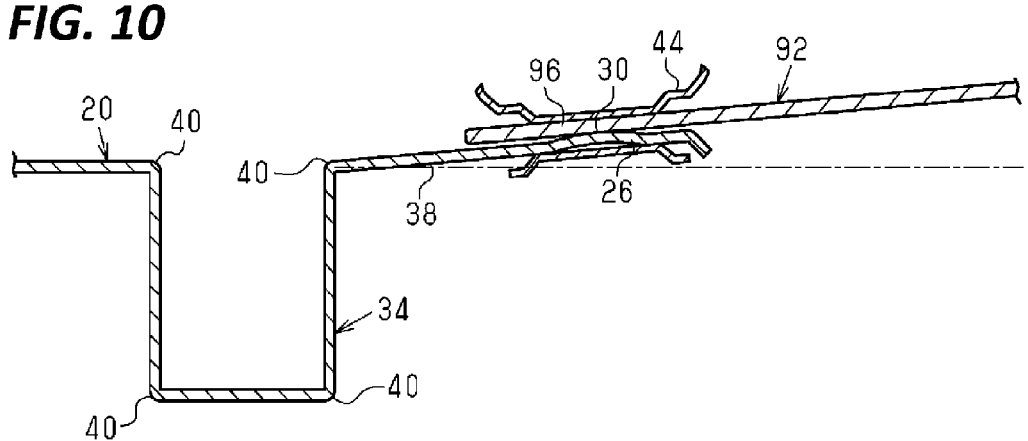
FIG. 10 is a partial section of the connector device shown in FIG. 1.

Further, for example, as shown in FIGS. 9 and 10, the angle of the bent part 40 at a boundary between the first stretchable portion 34 and the contact-side part 38 can be changed by resilient deformation in the first terminal fitting 20. Note that FIGS. 9 and 10 schematically show a state where only the bent part 40 at the boundary between the first stretchable portion 34 and the contact-side part 38 is resiliently deformed. In this way, the first electrical contact portion 26 is relatively displaceable in the vertical direction with respect to the first device-side connecting portion 24.

Further, in the first terminal fitting 20, each straight part can be deflected into a curved shape by being resiliently deformed when viewed from the lateral direction.

The first electrical contact portion 26 is relatively displaceable in the front-rear direction and vertical direction with respect to the first device-side connecting portion 24 by combining the respective resilient deformations described above.

Further, the second terminal fitting 92 can be deflected into a curved shape by resilient deformation when viewed from the lateral direction. Thus, the second electrical contact portion 96 is displaceable in the vertical direction with respect to the second device-side connecting portion 94.

Thus, even if the positions of the first and second in-vehicle devices 12, 16 are shifted in the front-rear direction or shifted in the vertical direction or shifted in the vertical direction while being shifted in the front-rear direction, the first and second electrical contact portions 26, 96 can be satisfactorily connected. Further, the first electrical contact portion 26, the first stretchable portion 34 and the first device-side connecting portion 24 are constituted by a single component. Further, the second terminal fitting 92 is constituted by a single component. Note that the single component mentioned here is not a component obtained by joining a plurality of members. Thus, a reduction in the number of components and the simplification of a structure can be advantageously realized as compared to a conventional structure in which terminal fittings are constituted by joining a plurality of members including a braided wire and the like.

Further, the holding force between the first and second electrical contact portions 26, 96 is set to be larger than the force necessary for the resilient deformation of the first stretchable portion 34. Thus, when the first and second in-vehicle devices 12, 16 are relatively displaced due to vibration or the like caused by the travel of the vehicle, the first stretchable portion 34 is resiliently deformed earther than relative displacements of the first and second electrical contact portions 26, 96 in the front-rear direction. Thus, the wear of the first and second electrical contact portions 26, 96 is suppressed. Note that since the holding force between the first and second electrical contact portions 26, 96 uses the friction forces between the members contacting in the direction intersecting the length direction of the first terminal fitting 20, a special structure for generating a force other than the friction forces is unnecessary. Therefore, the first and second terminal fittings 20, 92 need not be designed or worked into special structures.

Since the first terminal fitting 20 is thinner than the second terminal fitting 92, the first stretchable portion 34 is easily resiliently deformed. Further, the second terminal fitting 92 is hard to bend since being thicker than the first terminal fitting 20. Particularly, since the second electrical contact portion 96 of this embodiment project to the outside of the second in-vehicle device 16, the second electrical contact portion 96 may collide with another member before being connected to the first electrical contact portion 26. However, the bending of the second terminal fitting 92 is suppressed since the second terminal fitting 92 is thicker than the first terminal fitting 20.

<Modifications>

Although the embodiment has been described in detail as a specific example of the present disclosure above, the present disclosure is not limited by this specific description. The present disclosure encompasses modifications, improvements and the like within such a range that the aim of the present disclosure can be achieved. For example, the following modifications of the embodiment are also included in the technical scope of the present disclosure.

(1) The first terminal fitting 20 may be provided with a plurality of the first stretchable portions 34. Further, the first stretchable portion 34 may be absent in the first terminal fitting 20. A first stretchable portion can also be constituted by one vertical wall linking the device-side part 36 and the contact-side part 38. In this case, a first terminal fitting is cranked (stepped), and the first device-side connecting portion 24 and the first electrical contact portion 26 may be shifted in the vertical direction in an initial shape of the first terminal fitting.

(2) The second terminal fitting 92 may be provided with a second stretchable portion similar to the first stretchable portion 34 of the first terminal fitting 20, and may be structured to be stretchable in a separating direction of the second device-side connecting portion 94 and the second electrical contact portion 96. Note that, in the case of providing the second stretchable portion, various shapes can be adopted similarly to the first stretchable portion 34. Further, the second terminal fitting 92 may be provided with a plurality of second stretchable portions.

(3) The width and thickness of the first terminal fitting 20 may change halfway. For example, in the first terminal fitting 20, the width of the first stretchable portion 34 can be made smaller than those of the device-side part 36 and the contact-side part 38 to reduce the deformation stiffness of the first stretchable portion 34. Further, for example, the first terminal fitting 20 can be provided with partial projecting parts such as the positioning pieces 42 or partial recesses open in side surfaces, and the first terminal fitting 20 can also be positioned in the first connector housing 22 using the projecting parts and the recesses. Cross-sectional shape changes of the terminal fitting as described above are allowed not only in the first terminal fitting 20, but also in the second terminal fitting 92.

(4) The resilient member is not limited to the leaf spring clip 44 described in the above embodiment. For example, upper and lower coil springs for respectively biasing the overlapped first and second electrical contact portions 26, 96 toward each other in the vertical direction can be provided, and the first and second electrical contact portions 26, 96 can be held in the contact state by the resilience of these coil springs. In this case, the resilient member is configured to include the upper and lower coil springs.

(5) The resilient member is not essential. For example, if either one of the first and second electrical contact portions 26, 96 is a male terminal, the other is a female terminal and the first and second electrical contact portions 26, 96 are connected by fitting those male and female terminals, the resilient member as a separate component needs not be provided.

(6) Although the second connector 18 is constituted by the two second terminal fittings 92, 92 in the above embodiment, a second connector may be structured such that the second terminal fittings 92, 92 are accommodated in a second connector housing having a hollow structure. By providing the second connector housing, the two second terminal fittings 92, 92 are easily integrally handled as the second connector.

(7) The first connector housing 22 of the first connector 14 may be at least partially accommodated in the first case 84 as in the above embodiment or may be entirely disposed outside the first case 84 of the first in-vehicle device 12.

(8) Although the holding force between the first and second electrical contact portions 26, 96 uses the friction forces between the members contacting in the direction intersecting the length direction of the first terminal fitting 20 in the above embodiment, the holding force may include forces other than the friction forces.

Figure 11:
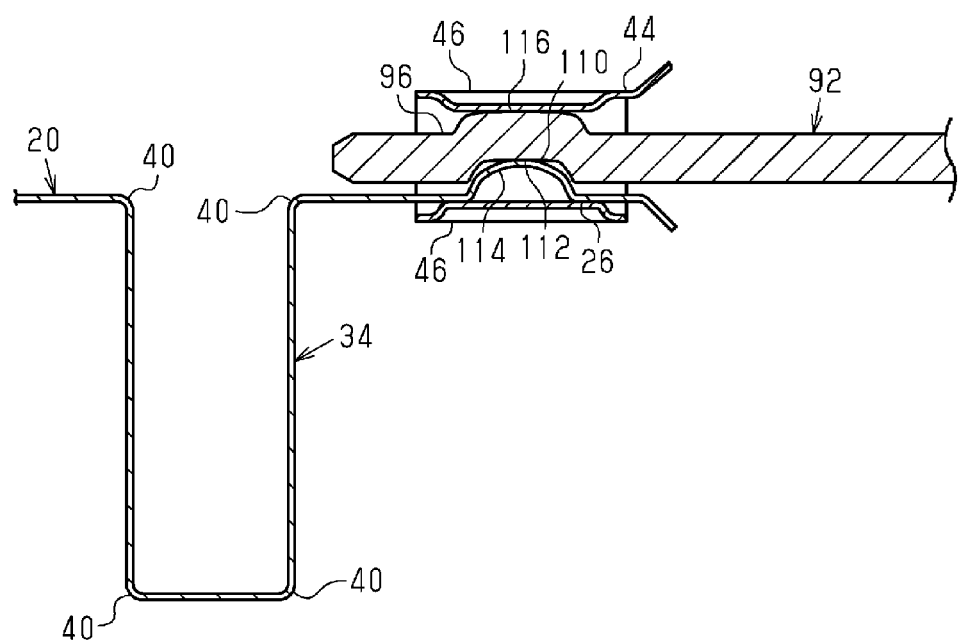
FIG. 11 is a partial section of a connector device according to another example.
Figure 12:
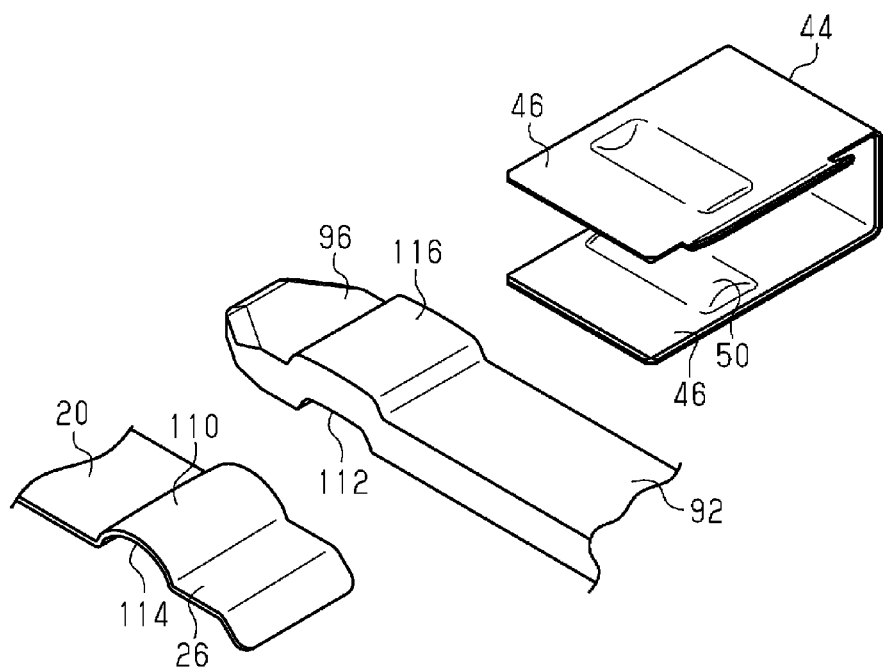
FIG. 12 is a partial exploded perspective view of the connector device according to the other example.

For example, as shown in FIGS. 11 and 12, the holding force between the first and second electrical contact portions 26, 96 may be set by changing the shapes of the first and second electrical contact portions 26, 96. In this example, the first electrical contact portion 26 includes a fitting portion 110 and the second electrical contact portion 96 includes a fit portion 112.

The fitting portion 110 is a protrusion provided on the upper surface of the first electrical contact portion 26. The fitting portion 110 is entirely formed on the first electrical contact portion 26 in the lateral direction, i.e. the width direction. The fitting portion 110 has an arcuate shape when viewed from the width direction of the first electrical contact portion 26. The first electrical contact portion 26 is press-worked to be partially convex upward, thereby forming the fitting portion 110. Thus, the first electrical contact portion 26 includes a recess 114 corresponding to the fitting portion 110 in a lower surface.

The fit portion 112 is a recess provided in the lower surface of the second electrical contact portion 96. The fit portion 112 is entirely formed on the second electrical contact portion 96 in the lateral direction, i.e. the width direction. The second electrical contact portion 96 is press-worked to be partially convex upward, thereby forming the fit portion 112. Thus, the second electrical contact portion 96 includes a protrusion 116 corresponding to the fit portion 112 on an upper surface.

The fitting portion 110 is fit upward, which is a direction intersecting the length direction of the first terminal fitting 20, into the fit portion 112. In this way, the holding force between the first and second electrical contact portions 26, 96 includes an engaging force between the fitting portion 110 and the fit portion 112 engaged in the length direction of the first terminal fitting 20. The holding force between the first and second electrical contact portions 26, 96 including the engaging force between the fitting portion 110 and the fit portion 112 is set to be larger than the force necessary for the resilient deformation of the first stretchable portion 34.

Also in this way, when the first and second in-vehicle devices 12, 16 are relatively displaced due to vibration or the like caused by the travel of the vehicle, the first stretchable portion 34 is resiliently deformed earlier than relative displacements of the first and second electrical contact portions 26, 96 in the front-rear direction. Thus, the wear of the first and second electrical contact portions 26, 96 is suppressed. Further, in this example, the holding force between the first and second electrical contact portions 26, 96 can be set larger than the force necessary for the resilient deformation of the first stretchable portion 34, using the engaging force between the fitting portion 110 and the fit portion 112 engaged in the length direction of the first terminal fitting 20. Thus, for example, as compared to the above embodiment in which the engaging force of the fitting portion 110 and the fit portion 112 is not used, the holding force between the first and second electrical contact portions 26, 96 can be stably set to be large.

(6) Although the first and second cases 84, 100 are configured to be arranged away from each other in the front-rear direction in the above embodiment, there is no limitation to this. The first and second cases 84, 100 may be arranged in proximity in the front-rear direction.

Figure 13:
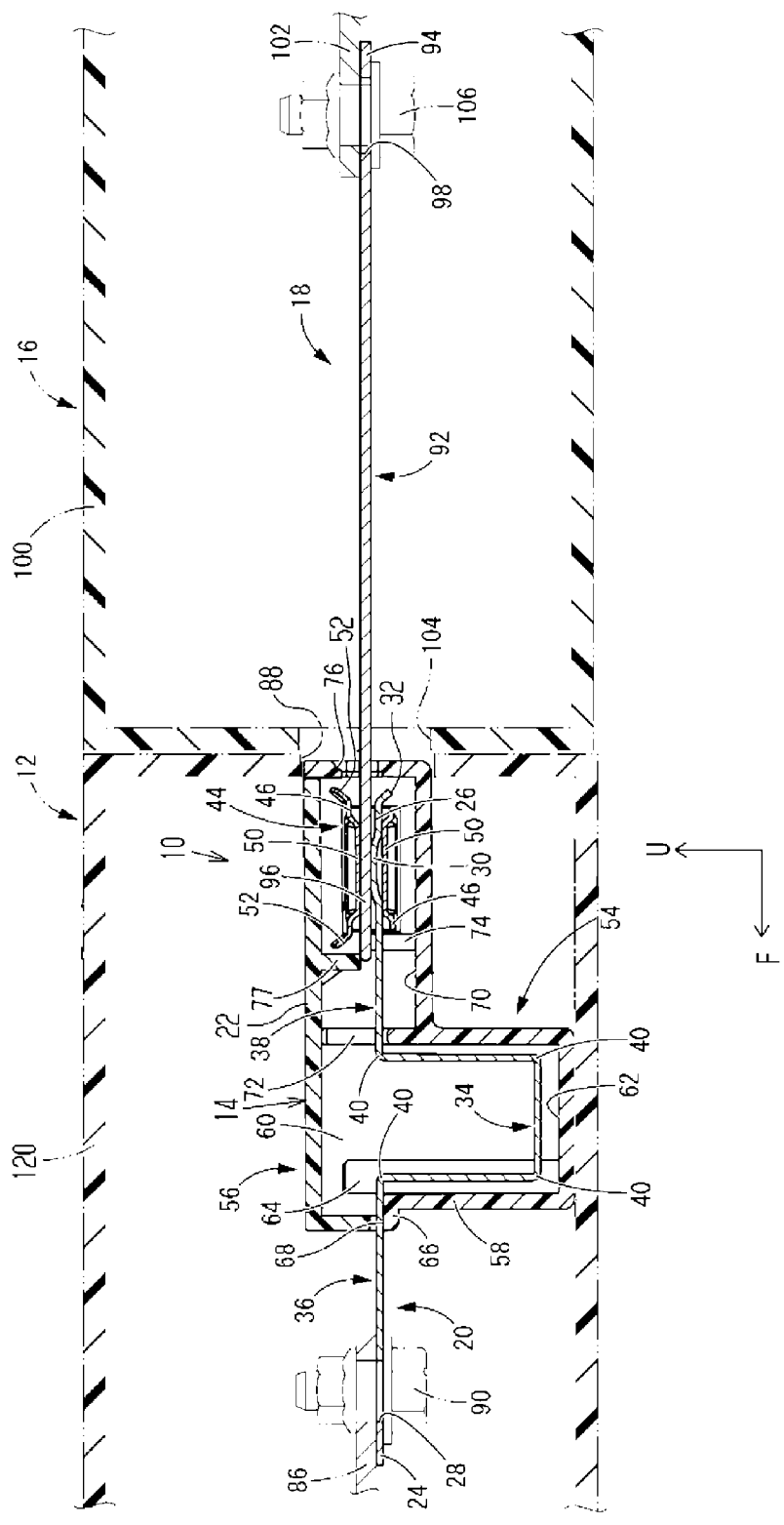
FIG. 13 is a longitudinal section of a connector device according to another example.

For example, as shown in FIG. 13, a first case 120 may be configured to accommodate the entire first connector housing 22.

Figure 14:
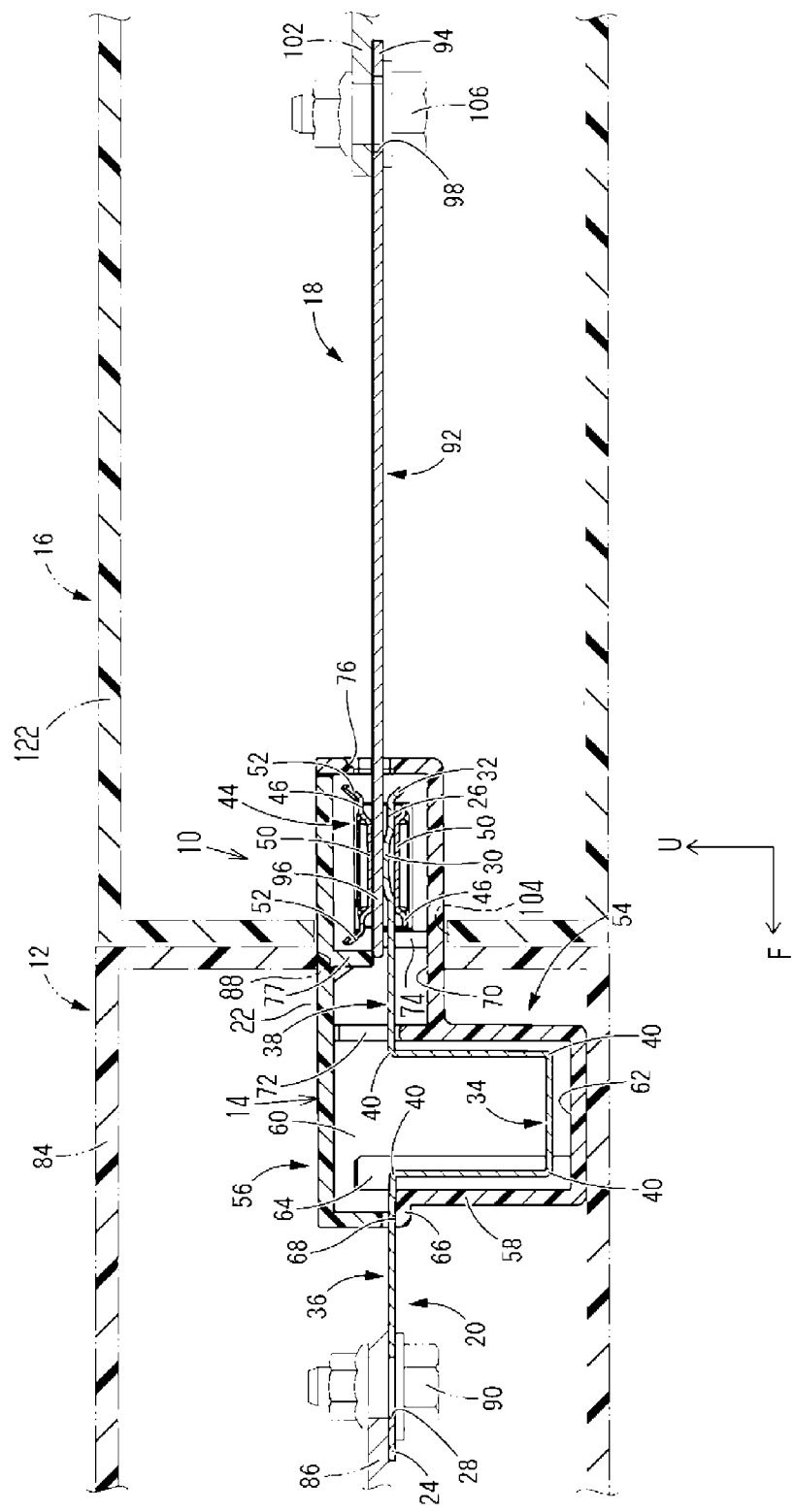
FIG. 14 is a longitudinal section of a connector device according to another example.

Further, for example, as shown in FIG. 14, a second case 122 may be configured to be able to substantially entirely accommodate the second electrical contact portions 96 and accommodate a rear part of the first connector housing 22.

In this way, the exposure of the connector device 10 can be prevented.

As shown in FIGS. 2, 13 and 14, the connector device 10 may be configured to electrically connect the first connection terminal 86 serving as the first terminal portion inside the first case 84 and the second connection terminal 102 serving as the second terminal portion inside the second case 100 not via flexible wires such as stranded wires therebetween, but via the first and second terminal fittings 20, 92. The connector device 10 of the embodiment may be configured to electrically connect the first and second in-vehicle devices 12, 16 without via flexible wires such as stranded wires therebetween.

The first device-side connecting portion 24 may be the base end or fixed end of the first terminal fitting 20, and the first electrical contact portion 26 may be the tip or free end of the first terminal fitting 20. In the first stretchable portion 34 of the first terminal fitting 20, the bent parts 40 may be, for example, configured to limit a resilient deforming direction of the first terminal fitting 20. For example, bending directions and/or bent positions of the bent parts 40 may be so determined that distances between the free end and the fixed end of the first terminal fitting 20 in the length direction and the thickness direction of the first terminal fitting 20 easily change, a distance between the free end and the fixed end of the first terminal fitting 20 in the width direction of the first terminal fitting 20 hardly changes, and the free end of the first terminal fitting 20 is hardly twisted with respect to the fixed end of the first terminal fitting 20.

As shown in FIGS. 2 to 4, the first stretchable portion 34 may be formed by bending or curving the first terminal fitting 20 at bending angles, which can be right angles, obtuse angles or acute angles, in the plate thickness direction at a plurality of positions between the both end parts (e.g. first device-side connecting portion 24 and the first electrical contact portion 26) of the first terminal fitting 20.

As shown in FIG. 3, the device-side part 36 located forward of the first stretchable portion 34 and including the first device-side connecting portion 24 and the contact-side part 38 located rearward of the first stretchable portion 34 and including the first electrical contact portion 26 in the first terminal fitting 20 may extend in parallel to each other. When the first terminal fitting 20 is in a natural state without being resiliently deformed as shown in FIG. 3, the first device-side connecting portion 24 and the first electrical contact portion 26 may, for example, extend on a common virtual plane.

The first device-side connecting portion 24 and the first electrical contact portion 26 may be located on two parallel virtual planes having different heights.

As shown in FIGS. 5 to 7, the pair of flat plate portions 46 of the leaf spring clip 44 can include the sandwiching protrusions 50 and non-projecting parts not formed with the sandwiching protrusions 50, and the non-projecting parts of the flat plate portions 46 may face the first and second electrical contact portions 26, 96 with gaps therebetween with the first and second electrical contact portions 26, 96 sandwiched by the sandwiching protrusions 50. These gaps are advantageous in maintaining the contact of the first and second electrical contact portions 26, 96 with the sandwiching protrusions 50 while allowing the inclination of the first or second electrical contact portion 26, 96 with respect to the leaf spring clip 44.

The first stretchable portion 34 of the embodiment may be referred to as a bent and deformed portion. The device-side part 36 and the contact-side part 38 may be referred to as a first straight portion and a second straight portion. The sandwiching protrusion 50 may be referred to as a ridge portion.

Embodiments of the present disclosure are listed and described below.

(1) A connector of the present disclosure is provided with a first terminal fitting including a first device-side connecting portion constituted by a busbar, provided on one end side and to be connected to a terminal portion of a first in-vehicle device and a first electrical contact portion provided on the other end side and to be connected to a mating electrical contact portion, and a first connector housing for accommodating the first terminal fitting, and the first electrical contact portion is displaceably accommodated in the first connector housing.

According to the connector of the present disclosure, the first terminal fitting is constituted by the busbar, which is a single component. Further, a position shift from the mating electrical contact portion can be absorbed using a displacement of the first electrical contact portion by a simple structure of displaceably accommodating the first electrical contact portion in the first connector housing. Thus, a reduction in the number of components and the simplification of the structure can be advantageously achieved as compared to a conventional structure in which a terminal fitting needs to be constituted by joining a plurality of members including a braided wire and a supporting member for supporting an electrical contact portion and a mechanism for displaceably holding the supporting member in a connector housing are necessary.

(2) Preferably, the first terminal fitting includes a first stretchable portion formed by bending a part between the first device-side connecting portion and the first electrical contact portion in a plate thickness direction and stretchable in a separating direction of the first device-side connecting portion and the first electrical contact portion, and the first stretchable portion is stretchably accommodated in the first connector housing. Since the first terminal fitting includes the extendable and contractible first stretchable portion in an intermediate region in a length direction of the first terminal fitting, position shifts of the first electrical contact portion and the mating electrical contact portion can be more advantageously absorbed. Moreover, the first stretchable portion can be easily provided by bending the first terminal fitting constituted by the busbar in the plate thickness direction, and configured without increasing the number of components. Further, by stretchably accommodating the first stretchable portion in the first connector housing, it is prevented that the extension and contraction of the first stretchable portion are limited by the first connector housing.

(3) Preferably, a resilient member is provided which holds the first electrical contact portion in contact with the mating electrical contact portion, and the resilient member is accommodated in the first connector housing in a state displaceable according to a displacement of the first electrical contact portion. By including the resilient member for holding the first electrical contact portion constituted by the busbar and in the form of a flat plate in contact with the mating electrical contact portion, conduction stability between the both electrical contact portions can be more reliably maintained. Further, since the resilient member is accommodated in the first connector housing displaceably according to the displacement of the first electrical contact portion, it is advantageously prevented by the resilient member that a position shift absorbing function is hindered by the displacement of the first electrical contact portion.

(4) Preferably, in (3) described above, the resilient member is constituted by a leaf spring clip including a pair of flat plate portions arranged to face each other with a gap therebetween and a coupling plate portion coupling one side edge parts of the pair of flat plate portions, the leaf spring clip is mounted on the first electrical contact portion with the first electrical contact portion inserted between the pair of flat plate portions and one of the pair of flat plate portions overlapped on a bottom surface of the first electrical contact portion, and the mating electrical contact portion is inserted between the pair of flat plate portions to be overlapped on the first electrical contact portion. In this way, the resilient member can be provided using the leaf spring clip. Moreover, a structure of accommodating the resilient member in the first connector housing displaceably according to the displacement of the first electrical contact portion can be constructed only by mounting the leaf spring clip on the first electrical contact portion. Therefore, the structure of the connector can be more simplified.

(5) Preferably, the first electrical contact portion includes a dome-shaped contact point portion projecting toward the mating electrical contact portion. Since the contact point portion provided at the first electrical contact portion has a dome shape, a contact state between the both electrical contact portions can be stably maintained even if the mating electrical contact portion to be overlapped on the first electrical contact portion is twisted and displaced such as by being rolled.

(6) A connector device of the present disclosure is provided with a first connector provided in a first in-vehicle device and a second connector provided in a second in-vehicle device and to be connected to the first connector, and the first connector is the connector of any one of (1) to (5) described above.

According to the connector device of the present disclosure, since the first connector is the connector of any one of (1) to (5) described above, the both first and second connectors can be reliably connected by absorbing position shifts thereof, and the aforementioned functions and effects by the connector of the present disclosure can be similarly enjoyed.

(7) Preferably, in (6) described above, the second connector includes a second terminal constituted by a busbar, the second terminal fitting includes a second device-side connecting portion provided on one end side and to be connected to a terminal portion of the second in-vehicle device and a second electrical contact portion provided on the other end side and to be connected to the first electrical contact portion, and the second electrical contact portion projects outward in a displaceable state from an insertion hole provided in a casing of the second in-vehicle device. Since the second terminal fitting of the second connector is also constituted by the busbar and the second electrical contact portion projects outward in the displaceable state from the second in-vehicle device, position shifts between the respective electrical contact portions of the first and second connectors can be more advantageously absorbed and connection between the both electrical contact portions can be stably realized, using displacements of the both first and second electrical contact portions at the time of connecting the first and second connectors. Moreover, since the second terminal fitting is also constituted by the busbar, which is a single component, a reduction in the number of components and the simplification of the structure can be more advantageously achieved.

LIST OF REFERENCE NUMERALS 10 connector device
12 first in-vehicle device
14 first connector (connector)
16 second in-vehicle device
18 second connector
20 first terminal fitting
22 first connector housing
24 first device-side connecting portion
26 first electrical contact portion
28 first bolt hole
30 contact point portion
32 guiding portion
34 first stretchable portion
36 device-side part
38 contact-side part
40 bent part
42 positioning piece
44 leaf spring clip (resilient member)
46 flat plate portion
48 coupling plate portion
50 sandwiching protrusion
52 guide piece
54 first member
56 second member
58 peripheral wall
60 partition wall portion
62 first accommodation recess
64 positioning protrusion
66 terminal receiving portion
67 projecting portion
68 device-side insertion portion
70 second accommodation recess
72 first position defining portion
74 second position defining portion
76 insertion window
77 third position defining portion
78 locking claw
80 locking piece
82 claw insertion hole
84 first case
86 first connection terminal (first terminal portion)
88 first window portion
90 first bolt
92 second terminal fitting
94 second device-side connecting portion
96 second electrical contact portion (mating electrical contact portion)
98 second bolt hole
100 second case (casing)
102 second connection terminal (second terminal portion)
104 second window portion (insertion hole)
106 second bolt
110 fitting portion
112 fit portion
114 recess
116 protrusion
120 first case
122 second case

What is claimed is:

1. A connector capable of electrically connecting a first terminal portion of a first in-vehicle device and a flat plate-like mating electrical contact portion of a second in-vehicle device, comprising:
   a first terminal fitting; and
   a first connector housing for accommodating the first terminal fitting,
   the first terminal fitting including a first device-side connecting portion projecting with a projection length from the first connector housing to be connectable to the first terminal portion and a first electrical contact portion connectable to the mating electrical contact portion and arranged on a side opposite to the first device-side connecting portion in a length direction of the first terminal fitting,
   the first electrical contact portion and the first device-side connecting portion being constituted by a single component,
   the first electrical contact portion being relatively displaceable with respect to the first device-side connecting portion,
   the projection length of the first device-side connecting portion from the first connector housing not changing and the first electrical contact portion of the first terminal fitting being displaced in the first connector housing when the first electrical contact portion is relatively displaced with respect to the first device-side connecting portion,
   the connector comprising a resilient member to be accommodated into the first connector housing,
   the resilient member being capable of holding the first electrical contact portion in contact with the mating electrical contact portion and displaceable according to a displacement of the first electrical contact portion in the first connector housing,
   the resilient member including a pair of flat plate portions arranged to face each other with a gap therebetween and a coupling plate portion coupling the pair of flat plate portions,
   the resilient member being capable of sandwiching the first electrical contact portion and the mating electrical contact portion in a contact state in mutually contacting directions by the pair of flat plate portions,
   each of the pair of flat plate portions including a sandwiching protrusion projecting inward in a facing direction,
   the sandwiching protrusions being capable of sandwiching the first electrical contact portion and the mating electrical contact portion in the contact state in the mutually contacting directions,
   the first electrical contact portion including a contact point portion connectable to the mating electrical contact portion, the contact point portion being a circular dome-shaped projection having a diameter in a plan view, each of the sandwiching protrusions of the pair of flat plate portions of the resilient member being an elongated protrusion having an arcuate cross-section, one of the sandwiching protrusions of the pair of flat plate portions being configured to contact the flat plate-like mating electrical contact portion with a contact length in the length direction of the first terminal fitting with the resilient member sandwiching the first electrical contact portion and the mating electrical contact portion, and the sandwiching protrusion having the arcuate cross-section of the resilient member and the circular dome-shaped contact point portion of the first electrical contact portion allowing the flat plate-like mating electrical contact portion to be twisted and displaced in an out-of-plane direction of the flat plate-like mating electrical contact portion with the resilient member sandwiching the first electrical contact portion and the mating electrical contact portion.

2. The connector of claim 1, wherein:
the first terminal fitting includes a first stretchable portion between the first device-side connecting portion and the first electrical contact portion, and
the first electrical contact portion is relatively displaceable with respect to the first device-side connecting portion by resilient deformation of the first stretchable portion.

3. The connector of claim 2, wherein the first stretchable portion is formed by bending the first terminal fitting.

4. A connector device for electrically connecting a first terminal portion of a first in-vehicle device and a second terminal portion of a second in-vehicle device, comprising:
a first connector mountable into the first in-vehicle device; and
a second connector mountable into the second in-vehicle device,
the first connector including a first terminal fitting and a first connector housing for accommodating the first terminal fitting,
the second connector including a second terminal fitting,
the second terminal fitting including a second device-side connecting portion connectable to the second terminal portion and a flat plate-like second electrical contact portion to be connected to the first terminal fitting and arranged on a side opposite to the second device-side connecting portion,
the first terminal fitting including a first device-side connecting portion projecting with a projection length from the first connector housing to be connectable to the first terminal portion and a first electrical contact portion to be connected to the second electrical contact portion and arranged on a side opposite to the first device-side connecting portion in a length direction of the first terminal fitting,
the first electrical contact portion and the first device-side connecting portion being constituted by a single component,
the first electrical contact portion being relatively displaceable with respect to the first device-side connecting portion,
the projection length of the first device-side connecting portion from the first connector housing not changing and the first electrical contact portion of the first terminal fitting being displaced in the first connector housing when the first electrical contact portion is relatively displaced with respect to the first device-side connecting portion, the first connector including a resilient member to be accommodated into the first connector housing, the resilient member being capable of holding the first electrical contact portion in contact with the second electrical contact portion and displaceable according to a displacement of the first electrical contact portion in the first connector housing, the resilient member including a pair of flat plate portions arranged to face each other with a gap therebetween and a coupling plate portion coupling the pair of flat plate portions, the resilient member being capable of sandwiching the first electrical contact portion and the second electrical contact portion in a contact state in mutually contacting directions by the pair of flat plate portions, each of the pair of flat plate portions including a sandwiching protrusion projecting inward in a facing direction, the sandwiching protrusions being capable of sandwiching the first electrical contact portion and the second electrical contact portion in the contact state in the mutually contacting directions, the first electrical contact portion including a contact point portion connectable to the second electrical contact portion, the contact point portion being a circular dome-shaped projection having a diameter in a plan view, each of the sandwiching protrusions of the pair of flat plate portions of the resilient member being an elongated protrusion having an arcuate cross-section, one of the sandwiching protrusions of the pair of flat plate portions being configured to contact the flat plate-like second electrical contact portion with a contact length in the length direction of the first terminal fitting with the resilient member sandwiching the first electrical contact portion and the second electrical contact portion, and the sandwiching protrusion having the arcuate cross-section of the resilient member and the circular dome-shaped contact point portion of the first electrical contact portion allowing the flat plate-like second electrical contact portion to be twisted and displaced in an out-of-plane direction of the flat plate-like second electrical contact portion with the resilient member sandwiching the first electrical contact portion and the second electrical contact portion.

5. The connector device of claim 4, wherein:
the second electrical contact portion and the second device-side connecting portion are constituted by a single component, and
the second electrical contact portion is relatively displaceable with respect to the second device-side connecting portion.

6. The connector device of claim 5, wherein the second electrical contact portion projects to outside of the second in-vehicle device with the second connector mounted in the second in-vehicle device.

7. The connector device of claim 4, wherein:
the first terminal fitting includes a first stretchable portion between the first device-side connecting portion and the first electrical contact portion, the first electrical contact portion is relatively displaceable with respect to the first device-side connecting portion by resilient deformation of the first stretchable portion, and the first stretchable portion is formed by bending the first terminal fitting.

8. The connector device of claim 7, wherein the first terminal fitting is thinner than the second terminal fitting.

9. The connector device of claim 7, wherein a holding force between the first and second electrical contact portions is set to be larger than a force necessary for the resilient deformation of the first stretchable portion.

10. The connector device of claim 9, wherein the holding force between the first and second electrical contact portions includes a friction force between members contacting in a direction intersecting the length direction of the first terminal fitting.

11. The connector device of claim 9, wherein:
either one of the first and second electrical contact portions includes a fitting portion,
the other of the first and second electrical contact portions includes a fit portion,
the fitting portion is fit to the fit portion in a direction intersecting the length direction of the first terminal fitting, and
the holding force between the first and second electrical contact portions includes an engaging force between the fitting portion and the fit portion engaged in the length direction of the first terminal fitting.

* * * * *